US011001665B1

(12) United States Patent
Schornstein et al.

(10) Patent No.: US 11,001,665 B1
(45) Date of Patent: May 11, 2021

(54) OPEN-CELL RIGID POLYURETHANE FOAM AND THE USE THEREOF

(71) Applicant: Covestro Intellectual Property GmbH & Co. KG, Leverkusen (DE)

(72) Inventors: Marcel Schornstein, Neuss (DE); Peter Nordmann, Dormagen (DE); Marina Reithmeier, Cologne (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 0 days.

(21) Appl. No.: 17/048,652

(22) PCT Filed: Apr. 23, 2019

(86) PCT No.: PCT/EP2019/060295
§ 371 (c)(1),
(2) Date: Oct. 19, 2020

(87) PCT Pub. No.: WO2019/206865
PCT Pub. Date: Oct. 31, 2019

(30) Foreign Application Priority Data

Apr. 25, 2018 (EP) .................... 18169149

(51) Int. Cl.
| | | |
|---|---|---|
| *C08G 18/76* | (2006.01) | |
| *C08J 9/00* | (2006.01) | |
| *C08G 18/48* | (2006.01) | |
| *C08G 18/32* | (2006.01) | |
| *C08G 18/18* | (2006.01) | |
| *C08G 18/16* | (2006.01) | |
| *C08G 18/09* | (2006.01) | |
| *C08J 9/02* | (2006.01) | |
| *C08G 18/22* | (2006.01) | |

(52) U.S. Cl.
CPC ....... *C08G 18/7664* (2013.01); *C08G 18/092* (2013.01); *C08G 18/095* (2013.01); *C08G 18/163* (2013.01); *C08G 18/168* (2013.01); *C08G 18/1841* (2013.01); *C08G 18/1858* (2013.01); *C08G 18/3206* (2013.01); *C08G 18/4812* (2013.01); *C08G 18/4825* (2013.01); *C08G 18/4829* (2013.01); *C08G 18/4837* (2013.01); *C08J 9/0061* (2013.01); *C08J 9/02* (2013.01); *C08G 18/225* (2013.01); *C08G 2110/0025* (2021.01); *C08G 2110/0058* (2021.01); *C08G 2115/02* (2021.01); *C08G 2115/06* (2021.01); *C08G 2330/50* (2013.01); *C08J 2205/044* (2013.01); *C08J 2205/05* (2013.01); *C08J 2205/10* (2013.01); *C08J 2375/08* (2013.01); *C08J 2483/12* (2013.01)

(58) Field of Classification Search
CPC .. C08G 18/092; C08G 18/095; C08G 18/163; C08G 18/168; C08G 18/1841; C08G 18/1858; C08G 18/225; C08G 18/3206; C08G 18/4812; C08G 18/4825; C08G 18/4829; C08G 18/4837; C08G 18/7664; C08G 2110/0025; C08G 2110/0058; C08G 2115/02; C08G 2115/06; C08G 2330/50; C08J 9/0061; C08J 9/02; C08J 2205/044; C08J 2205/05; C08J 2205/10; C08J 2375/08; C08J 2483/12
See application file for complete search history.

(56) References Cited

U.S. PATENT DOCUMENTS

| | | |
|---|---|---|
| 5,234,960 A | 8/1993 | Leenslag |
| 5,250,579 A | 10/1993 | Smits et al. |
| 5,312,846 A | 5/1994 | Smits et al. |
| 5,350,777 A | 9/1994 | Yasuto et al. |
| 5,889,067 A | 3/1999 | Jang et al. |
| 2003/0130365 A1* | 7/2003 | Eling .............. C08J 9/0066 521/99 |
| 2013/0237622 A1* | 9/2013 | Wujcik ............ C08L 75/08 521/108 |
| 2018/0319926 A1* | 11/2018 | Fregni ............. C08J 9/0066 |

FOREIGN PATENT DOCUMENTS

| | | |
|---|---|---|
| DE | 4303809 A1 | 8/1994 |
| EP | 0381324 A1 | 8/1990 |
| EP | 0498628 A1 | 8/1992 |
| EP | 0905158 A1 | 3/1999 |
| EP | 0905159 A1 | 3/1999 |
| EP | 2072548 A2 | 6/2009 |
| WO | 0198389 A1 | 12/2001 |
| WO | 2011/054868 A2 | 5/2011 |
| WO | 2015109488 A1 | 7/2015 |

OTHER PUBLICATIONS

International Search Report, PCT/EP2019/060295, dated Jul. 10, 2019, Authorized officer: Florian Paulus.
Ionescu in "Chemistry and Technology of Polyols for Polyurethanes", Rapra Technology Limited, Shawbury 2005, p. 55 ff. (chapt. 4: Oligo-Polyols for Elastic Polyurethanes), p. 263 ff. (chapt. 8: Polyester Polyols for Elastic Polyurethanes) and in particular on p. 321 ff. (chapt. 13: Polyether Polyols for Rigid Polyurethane Foams) and p. 419 ff. (chapt. 16: Polyester Polyols for Rigid Polyurethane Foams).
Kunststoff-Handbuch, vol. 7, Polyurethane, Carl Hanser Verlag, Munich/Vienna, 3rd edition, 1993, pp. 104-127.

* cited by examiner

*Primary Examiner* — John M Cooney
(74) *Attorney, Agent, or Firm* — N. Denise Brown

(57) ABSTRACT

The present invention relates to open- and fine-celled rigid polyurethane foams which contain not only urethane groups (PUR) but also isocyanurate groups (PIR) and carbodiimide groups (CD) and to the use thereof in vacuum insulation panels.

4 Claims, No Drawings

OPEN-CELL RIGID POLYURETHANE FOAM AND THE USE THEREOF

CROSS-REFERENCE TO RELATED APPLICATION

This application is a national stage application under 35 U.S.C. § 371 of PCT/EP2019/060295, filed Apr. 23, 2019, which claims the benefit of European Application No. 18169149, filed Apr. 25, 2018, each of which is incorporated herein by reference.

FIELD

The present invention relates to open-celled polyurethane foams and the use thereof in vacuum insulation panels. In addition to urethane groups (PUR) the foams may also contain isocyanurate groups (PIR). In the present application unless otherwise stated the description rigid PUR/PIR foam is to be understood as meaning not only rigid foams comprising substantially urethane groups but also rigid foams containing both urethane groups and isocyanurate groups.

BACKGROUND

Rigid PUR/PIR foams have long been known. Thermal insulation is a substantial area of application. The use of vacuum insulation panels (VIP) containing rigid PUR/PIR foams for insulation is increasing in importance. Foam quality has a decisive influence on the insulation properties of foams used for vacuum insulation: on the one hand a very small cell size and very homogeneous cell sizes are advantageous and on the other hand a high proportion of open cells is advantageous to allow the foam to be readily evacuated.

The production of open-celled rigid PUR/PIR foams is known in principle. Certain cell-opening substances are generally added to the reaction mixture to bring about an opening of the cells during the foaming process.

Thus U.S. Pat. No. 5,350,777 describes the use of alkaline earth metal salts of long-chain fatty acids as cell openers.

EP-A 498 628 A discloses the production of rigid open-celled foams by way of a thermally activatable blowing agent. This process has the disadvantage that the foam cells are opened merely where a minimum temperature is exceeded in the course of the foam process and the obtained foams therefore do not exhibit a uniformly high open-cell content over the entire foam-filled volume.

DE-A 43 03 809 describes a process for producing rigid foams having an elevated open-cell content where the cell-opening effect of a liquid polyolefin addition is utilized. This process has the disadvantage of a narrow scope of application and also that inexact metering of the polyolefin addition rapidly leads to cell coarsening.

U.S. Pat. Nos. 5,250,579 and 5,312,846 disclose the cell-opening effect of substances having a surface tension of less than 23 mJ/m$^2$. However, these substances have the disadvantage that they contain organically bonded halogen.

U.S. Pat. No. 5,889,067 describes a process for producing an open-celled rigid polyurethane foam which comprises the production of the rigid polyurethane foam from polyol with a liquid blowing agent selected from the group consisting of hydrocarbons, hydrofluoroalkanes, perfluoroalkanes, mixtures of these blowing agents with one another or with water by addition of a monohydric fatty alcohol which has a good solubility in the hydrocarbons and serves as a cell opener and of a foam stabilizer which forms a very small cell in the presence of an isocyanate trimer catalyst and an organic isocyanate. The resulting open-celled rigid polyurethane foam has a cell size of less than about 95 μm and is suitable for example for use as a core material in a vacuum insulation panel.

EP 905 159 A and EP 905 158 A disclose processes for producing open-celled rigid polyurethane foams which preferably employ water in combination with hydrocarbons or hydrofluorocarbons as a blowing agent. The polyol formulations are said to contain 0.1-80% by weight of polyester alcohols which are preferably reaction products of ricinoleic acid and/or castor oil and/or tall oil fatty acid with polyfunctional alcohols. These components are said to act as emulsifiers for non-halogenated blowing agents. In the examples the claimed polyols are used to produce both open-celled and closed-celled foams, wherein the open-cell content is dependent on the presence of additives known as cell openers. While the cells of the obtained foams are described as fine-celled, according to the legend "very fine-celled" is to be understood as meaning a cell size range of 180-250 μm. In addition, nothing is said about the homogeneity of the cell size distribution.

EP 2 072 548 A describes a process for producing open-celled rigid PUR/PIR foams having an isocyanate index in the range between 150-400 by reaction of polyisocyanates with polyols having a functionality in the range from 2.5 to 5.5 and a hydroxyl number in the range of 200-400 mg KOH/g in the presence of a blowing agent mixture of water and at least one physical blowing agent. However, the open-cell content of the foams in the examples is obtained primarily with high proportions of cell-opening substances.

In the production of rigid PUR/PIR foams a polyol component also containing a blowing agent is reacted with an isocyanate. The reaction of isocyanate with water forms carbon dioxide, which also acts as a blowing agent. It is also known to add $CO_2$ to the polyol component or to the reaction mixture as a blowing agent.

An effect on fine-cell content and open-cell content was also found for the use of supercritical $CO_2$ in combination with certain process steps and components.

The abrupt decompression of $CO_2$-containing reaction mixtures is described in WO 2001/98389 A1. This patent application relates to a process for producing slabstock polyurethane foam, wherein a carbon dioxide-containing polyurethane reactive mixture is suddenly decompressed from a pressure above the equilibrium solution pressure of the carbon dioxide to standard pressure. The liquid polyurethane reactive mixture is foamed by the liberation of dissolved carbon dioxide and the foamed mixture is applied to a substrate and subsequently cured to afford slabstock foam. The carbon dioxide is initially fully dissolved in the reactive mixture or at least one of the components polyol and isocyanate at a pressure substantially above the equilibrium solution pressure. Subsequently the pressure is reduced to a pressure close to the equilibrium solution pressure, wherein the pressure is temporarily reduced below the equilibrium solution pressure to liberate small amounts of the carbon dioxide by forming a bubble microdispersion, the components are optionally mixed and the sudden pressure reduction to standard pressure is performed before the liberated carbon dioxide fully redissolves. However, no information about nanocellular foams or supercritical conditions for the blowing agent may be found here.

WO 2011/054868 A and WO 2011/054873 A disclose production processes for fine-celled urethane group-containing foams using $CO_2$ as a supercritical blowing agent. The production of a microemulsion from the polyol phase and supercritical $CO_2$ is decisive for the success of the process in both cases. Said microemulsion is to be established through the use of suitable surfactant components. However, there is no indication of how this process is used to produce foams having predominantly open cells.

WO 2015/109488 A likewise describes a production process for urethane group-containing foams using $CO_2$ as a supercritical blowing agent. The production process is a multistage process, wherein the polyol component must initially be saturated with $CO_2$ under supercritical conditions before the reaction mixture is subsequently subjected to pressures of at least 100 bar. The produced foams are said to have small cell sizes and a high porosity. However, foams having a high open-cell content are found only when using propylene oxide-based polyethers and when using two very specific cell-opening surfactants in a particular ratio. The process provides foams having densities >>100 kg/m³. The total duration for the multistage process (saturation, reaction, curing) in the reactor is >>1 h during which time supercritical conditions must be maintained.

U.S. Pat. No. 5,234,960 describes a process for producing polymeric foams which employs special isocyanate-reactive compositions containing compounds having imino or enamino groups in amounts of >25% and phospholene oxide catalysts for carbodiimide production. The process described in this document affords foams having a density of 390 kg/m³. It is an object of the invention to promote the formation of carbodiimide moieties.

SUMMARY

Proceeding from the present prior art it is an object of the invention to provide a very fine-celled, open-celled urethane group-containing rigid foam (PUR/PIR rigid foam) which is additionally producible in a simple process. A very high open-cell content combined with a small cell size is desired especially for certain applications where this foam property makes it possible to reduce the thermal conductivity of the foam by application of negative pressure.

The present invention provides open-celled polyurethane foams having an open-cell content >90% (ISO 4590:2002; German version EN ISO 4590:2003), an average arithmetic cell size between 20-90 µm, preferably 30-80 µm, particularly preferably 40-70 µm, wherein the average arithmetic cell size is determined by optical microscopy evaluation using a VHX 5000 optical microscope and the test specimen to be analyzed is examined at 3 different points in each case over a circular region having a diameter of 5 mm, the resolution is chosen such that the selected region captures around 100 cells and 100 cells are analyzed, the smallest cell diameter and the "D90" cell diameter ("D90": where 90% of cells are smaller than this value) and the average arithmetic cell diameter are calculated, at an apparent density between 35-120 kg/m³, preferably 40-100 kg/m³, particularly preferably 40-70 kg/m³ (ISO 845:2006; German version EN ISO 845:2009), and a compressive strength at 10% compression (parallel) of 0.20-0.50 mPa (ISO 844:2014; German version EN ISO 844:2014), obtainable by the reaction of the components from the group consisting of A1) 90-100% by weight of a polyether polyol having a number-average functionality of 2-6 and an OH number of 50-900 mg KOH/g (DIN 53240-2, as at November 2007) based on ethylene and/or propylene oxide and 0-10% by weight of one or more polyester polyols, A2) optionally chain extenders and/or crosslinkers, B) at least one isocyanate component, in the presence of C) at least one phospholene oxide selected from the group consisting of 1-methylphospholene-1-oxide, 1-ethylphospholene-1-oxide and 1-phenylphospholene-1-oxide, D) catalysts, E) 0.1-2.0% by weight of cell openers, based on the isocyanate-reactive component (A1) and (A2), F) 0.1-5% by weight of surface-active substances and stabilizers based on the total weight of the components (A1) and (A2), G) optionally assistants and/or additives, wherein the ratio of the NCO groups of the component (B) to the OH groups of the component (A1) and optionally (A2) is 0.9:1 to 1.2:1.

DETAILED DESCRIPTION

In the context of the present application the "functionality" or "f" of a component mixture is to be understood as meaning the respective number-average functionality of the mixture to which the indication refers. Thus for example the functionality of the polyol component (A1) is to be understood as meaning the number-average functionality of the mixture of the polyols present in the component (A1) based on all isocyanate-reactive functions present.

In the context of the present application "molar weight" or "molar mass" or "$M_n$" is in each case to be understood as meaning the number-weighted average molar mass.

In the case of a single added polyol the OH number (also known as hydroxyl number) specifies the OH number of said polyol. Reported OH numbers for mixtures relate to the number-average OH number of the mixture calculated from the OH numbers of the individual components in their respective molar proportions. The OH number indicates the amount of potassium hydroxide in milligrams which is equivalent to the amount of acetic acid bound by one gram of substance during acetylation. In the context of the present invention said number is determined according to the standard DIN 53240-2, as at November 2007.

In the context of the present application "a polyether polyol" may also be a mixture of different polyether polyols, this also applying analogously to the other polyols recited here.

Suitable polyester polyols are inter alia polycondensates of di- and also tri- and tetraols and di- and also tri- and tetracarboxylic acids or hydroxycarboxylic acids or lactones. Also employable for producing the polyesters instead of the free polycarboxylic acids are the corresponding polycarboxylic anhydrides or corresponding polycarboxylic esters of lower alcohols.

Examples of suitable diols are ethylene glycol, butylene glycol, diethylene glycol, triethylene glycol, polyalkylene glycols such as polyethylene glycols and also 1,2-propanediol, 1,3-propanediol, 1,3-butanediol, 1,4-butanediol, 1,6-hexanediol and isomers, neopentyl glycol or neopentyl glycol hydroxypivalate. Also employable in addition are polyols such as trimethylolpropane, glycerol, erythritol, pentaerythritol, trimethylolbenzene or trishydroxyethyl isocyanurate.

In addition, monohydric alkanols can also be used.

Examples of polycarboxylic acids that may be used include phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, succinic acid, 2-methylsuccinic acid, 3,3-diethylglutaric acid, 2,2-dimethylsuccinic acid, dodecanedioic acid, endomethylenetetrahydrophthalic acid, dimer fatty acid, trimer fatty acid, citric acid, or trimellitic acid. It is also possible to use the corresponding anhydrides as the acid source.

Additional co-use of monocarboxylic acids such as benzoic acid and alkanecarboxylic acids is also possible.

Hydroxycarboxylic acids that may be co-used as reaction participants in the production of a polyester polyol having terminal hydroxyl groups are for example hydroxycaproic acid, hydroxybutyric acid, hydroxydecanoic acid, hydroxystearic acid and the like. Suitable lactones are inter alia caprolactone, butyrolactone and homologs.

Suitable compounds for producing the polyester polyols also include in particular bio-based starting materials and/or derivatives thereof, for example castor oil, polyhydroxy fatty acids, ricinoleic acid, hydroxyl-modified oils, grapeseed oil, black cumin oil, pumpkin kernel oil, borage seed oil, soybean oil, wheat germ oil, rapeseed oil, sunflower kernel oil, peanut oil, apricot kernel oil, pistachio oil, almond oil, olive oil, macadamia nut oil, avocado oil, sea buckthorn oil, sesame oil, hemp oil, hazelnut oil, *primula* oil, wild rose oil, safflower oil, walnut oil, fatty acids, hydroxyl-modified fatty acids and epoxidized fatty acids and fatty acid esters, for example based on myristoleic acid, palmitoleic acid, oleic acid, vaccenic acid, petroselic acid, gadoleic acid, erucic acid, nervonic acid, linoleic acid, alpha- and gamma-linolenic acid, stearidonic acid, arachidonic acid, timnodonic acid, clupanodonic acid and cervonic acid. Esters of ricinoleic acid with polyfunctional alcohols, for example glycerol, are especially preferred. Preference is also given to the use of mixtures of such bio-based acids with other carboxylic acids, for example phthalic acids.

Processes for preparing the polyols have been described for example by Ionescu in "Chemistry and Technology of Polyols for Polyurethanes", Rapra Technology Limited, Shawbury 2005, p. 55 ff. (chapt. 4: Oligo-Polyols for Elastic Polyurethanes), p. 263 ff. (chapt. 8: Polyester Polyols for Elastic Polyurethanes) and in particular on p. 321 ff. (chapt. 13: Polyether Polyols for Rigid Polyurethane Foams) and p. 419 ff. (chapt. 16: Polyester Polyols for Rigid Polyurethane Foams).

The isocyanate-reactive component (A) may further contain low molecular weight isocyanate-reactive compounds (A2), in particular di- or trifunctional alcohols, particularly preferably diols and/or triols having molar masses $M_n$ of less than 400 g/mol, preferably of 60 to 300 g/mol, for example diethylene glycol, ethylene glycol, glycerol, may be employed. Provided such low molecular weight isocyanate-reactive compounds are used for producing the rigid polyurethane foams, for example as chain extenders and/or crosslinking agents, and these do not also fall under the definition of the component (A1) they are advantageously employed in an amount of up to 5% by weight based on the total weight of the component (A1) and (A2).

Cell openers (E) are described for example in Kunststoff-Handbuch, volume 7, Polyurethane, Carl Hanser Verlag, Munich/Vienna, 3rd edition, 1993, pages 104-127. These are, for example, silicones, such as polyether-polydimethylsiloxane copolymers, or organic polymers, for example those based on polybutadiene (for example Ortegol 500 and 501 from Evonik Industries), surfactants, for example the sodium salt of ethoxylated and sulfated isotridecyl alcohol obtainable under the trade name Sermul EA266 (Elementis Specialties, The Netherlands), and also mixtures of different components, for example mixtures of amine-stabilized, macromolecular, unsaturated hydrocarbons and phthalate esters. Cell openers based on polybutadiene are preferred. The cell-opening components are preferably employed in amounts of not more than 2% by weight based on the isocyanate-reactive component (A1) and (A2). Particular preference is given to the use of 0.1-2.0% by weight, particularly preferably 0.25-0.75% by weight, in each case based on the total weight of the component (A1) and (A2).

Several of the known cell-opening compounds, for example the silicones, may also simultaneously assume roles as (F) surface-active substances and stabilizers, especially foam stabilizers. In this case it is also possible to employ amounts higher than the preferred amounts recited hereinabove for the cell-opening compounds.

Polyether-polydimethylsiloxane copolymers are often used as foam stabilizers, preferably a polyethylene oxide-polyether having oligodimethylsiloxane end groups, wherein the number of dimethyl siloxane units is preferably ≤5.

Employable stabilizers also include saturated and unsaturated hydrocarbons such as paraffins, polybutadienes, fatty alcohols and esters, for example esters of carboxylic acids.

Also employable as stabilizers are surface-active substances, for example alkoxylated alkanols such as ethers of linear or branched alkanols having ≥6 to ≤30 carbon atoms with polyalkylene glycols having ≥5 to ≤100 alkylene oxide units, alkoxylated alkylphenols, alkoxylated fatty acids, carboxylic esters of an alkoxylated sorbitan (especially Polysorbate 80), fatty acid esters, polyalkyleneamines, alkyl sulfates, phosphatidylinositols, fluorinated surfactants, surface-active substances comprising polysiloxane groups and/or bis(2-ethyl-1-hexyl) sulfosuccinate. Fluorinated surface-active substances may be perfluorinated or partially fluorinated. Examples thereof are partially fluorinated ethoxylated alkanols or carboxylic acids.

The components (A1) and (A2) altogether contain 0.1-5% by weight of surface-active substances and stabilizers, in particular foam stabilizers, preferably not more than 3% by weight, particularly preferably less than 2% by weight and especially preferably not more than 1.6% by weight, of surface-active substances based on the total weight of the components (A1) and (A2).

The polyurethane foam optionally contains assistant and additive substances (G) that may be employed in the foam according to the invention are the customary assistant and additive substances known from the prior art and to those skilled in the art. These include for example fillers, dyes, pigments, flame retardants, antistats, antihydrolysis agents and/or fungistatic and bacteriostatic substances.

Catalysts (D) are employed for the production of the rigid PUR/PIR foam. Typically employed as catalysts (D) are compounds which accelerate the reaction of hydroxyl group-containing/isocyanate-reactive group-containing compounds of the components with the isocyanate groups of the component (B).

The catalysts (D) contain at least one catalytically active amine compound having functional groups which comprise Zerewitinoff-active hydrogens and can therefore react with isocyanate (so-called "incorporable catalysts"). Examples of employable incorporable catalysts are bis(dimethylaminopropyl)urea, bis(N,N-dimethylaminoethoxyethyl)carbamate, dimethylaminopropylurea, N,N,N-trimethyl-N-hydroxyethylbis(aminopropyl ether), N,N,N-trimethyl-N-hydroxyethylbis(aminoethyl ether), diethylethanolamine, bis(N,N-dimethyl-3-aminopropyl)amine, dimethylaminopropylamine, 3-dimethyaminopropyl-N,N-dimethylpropane-1,3-diamine, dimethyl-2-(2-aminoethoxyethanol) and (1,3-bis(dimethylamino)propan-2-ol), N,N-bis(3-dimethylaminopropyl)-N-isopropanolamine, bis(dimethylaminopropyl)-2-hydroxyethylamine, N,N,N-trimethyl-N-3-aminopropylbis(aminoethyl ether), 3-dimethylaminoisopropyldiisopropanolamine or mixtures thereof.

Also employable are one or more further catalyst compounds, especially the catalytically active compounds known for PUR/PIR chemistry, including not only further amine compounds but also salts such as for example tin(II) acetate, tin(II) octoate, tin(II) ethylhexoate, tin(II) laurate, dibutyltin diacetate, dibutyltin dilaurate, dibutyltin maleate, dioctyltin diacetate, tris(N,N-dimethylaminopropyl)-s-hexahydrotriazine, tetramethylammonium hydroxide, sodium acetate, sodium octoate, potassium acetate, potassium octoate, sodium hydroxide.

The catalysts (D) are generally employed in an amount from 0.001 to 5% by weight, in particular from 0.05 to 2.5% by weight, based on the weight of the component (A1). It is particularly preferable when the catalysts (D) contain both incorporable catalysts and non-incorporable catalysts. It is especially preferable when incorporable amine compounds and catalytically active salts are employed in combination.

Production of the rigid PUR/PIR foam employs a blowing agent component (C).

The blowing agent (C) used is phospholene oxide which belongs to the group of chemical blowing agents. Phospholene oxides catalyze the reaction of isocyanates to afford carbodiimides, wherein the resulting $CO_2$ acts as a blowing agent for the PUR reaction. Examples of phospholene oxides are: 1-methylphospholene-1-oxide, 1-ethylphospholene-1-oxide, 1-phenyl-3-methylphospholene-1-oxide, 1-benzyl-3-methylphospholene-1-oxide, 1-ethyl-3-methylphospholane-1-oxide or mixtures thereof. It is preferable when the phospholene oxide is employed in an amount of 0.5-6% by weight, particularly preferably of 2% to 5% by weight, based on the total amount of compounds having isocyanate group-reactive hydrogen atoms in the foam-forming reaction mixture. Phospholene oxide is employed as the sole blowing agent. The blowing agent component (C) contains no further physical blowing agents.

In a preferred embodiment phospholene oxide is mixed with the further components (A1, A2, D, E, F) before the reaction with the isocyanate component (B). It is preferable to establish a concentration of 0.5-6 percent by weight of phospholene oxide based on (A1) and optionally (A2). The blowing agent component (C) is altogether employed in an amount sufficient to achieve a dimensionally stable foam matrix and the desired apparent density.

Preferably employed as the isocyanate component (B) are mixtures of the isomers of diphenylmethane diisocyanate ("monomeric MDI", "mMDI" for short) and oligomers thereof ("oligomeric MDI"). Mixtures of monomeric MDI and oligomeric MDI are generally described as "polymeric MDI" (pMDI). The oligomers of MDI are higher-nuclear polyphenylpolymethylene polyisocyanates, i.e. mixtures of the higher-nuclear homologs of diphenylmethylene diisocyanate which have an NCO functionality f>2 and have the following structural formula: $C_{15}H_{10}N_2O_2$ $[C_8H_5NO]_n$, wherein n=integer >0, preferably n=1, 2, 3 and 4. Higher-nuclear homologs $C_{15}H_{10}N_2O_2[C_8H_5NO]_m$, m=integer ≥4) may likewise be present in the mixture of organic polyisocyanates B).

In addition to the abovementioned polyisocyanates, it is also possible to co-use proportions of modified diisocyanates having a uretdione, isocyanurate, urethane, carbodiimide, uretonimine, allophanate, biuret, amide, iminooxadiazinedione and/or oxadiazinetrione structure and also unmodified polyisocyanate having more than 2 NCO groups per molecule, for example 4-isocyanatomethyl-1,8-octane diisocyanate (nonane triisocyanate) or triphenylmethane 4,4',4"-triisocyanate.

Also employable instead of or in addition to the abovementioned polyisocyanates as the organic isocyanate component (B) are suitable NCO prepolymers. The prepolymers are producible by reaction of one or more polyisocyanates with one or more polyols selected from the group consisting of polyether polyols, polyester polyols, polyether ester polyols, polycarbonate polyols and polyether polycarbonate polyols. The polyols have a hydroxyl number of 100-900 mg KOH/g.

The NCO content is preferably from ≥29.0% by weight to ≤32.0% by weight and preferably has a viscosity at 25° C. of ≥80 mPas to ≤2000 mPas, particularly preferably of ≥100 mPas to ≤800 mPas (dynamic viscosity determined according to DIN 53019 at 25° C.).

The rigid polyurethane foams are generally produced by reacting the components (A) and (B) in amounts such that the ratio of the NCO groups in the component (B) to the OH groups in the component (A) is 0.9:1 to 1.2:1. In this range urethane groups are preferably formed.

The PUR/PIR foams according to the invention are produced by known processes.

The PUR/PIR foams according to the invention make it possible in preferable fashion to produce foamed moldings and composite systems containing these moldings. The composite systems are often delimited both on the top surface and on the bottom surface by decorative layers. Suitable decorative layers include inter alia metals, plastics, wood and paper. Suitable fields of application of such discontinuously produced PUR/PIR composite systems include in particular industrial insulation of appliances such as refrigerators, chest freezers, fridge-freezers and boilers, cool containers and coolboxes and also of pipes.

The use of PUR/PIR foams in these fields is known per se to those skilled in the art and has already been described on many occasions. The PUR/PIR foams according to the invention are exceptionally suitable for these purposes since on account of their fine-cell content they feature low coefficients of thermal conductivity which can be still further enhanced by application of a vacuum.

The invention further relates to the use of the rigid PUR/PIR foams according to the invention in the production of refrigerators, freezers or fridge-freezers, wherein the mold provided during manufacture is in particular a housing part of a refrigerator, a freezer or a fridge-freezer.

The invention shall be more particularly elucidated with reference to the examples and comparative examples which follow.

EXAMPLES

Employed Standards/Analytical Instruments:

Determination of apparent density: Foams composed of rubber and plastics—determination of apparent density (ISO 845:2006); German version EN ISO 845:2009

Determination of open-cell content: Determination of the volume fraction of open and closed cells (ISO 4590:2002); German version EN ISO 4590:2003

Determination of compressive strength: Rigid foams—determination of pressure properties (ISO 844:2014); German version EN ISO 844:2014

Determination of OH number: Determination of hydroxyl number—part 2: Method with catalyst according to DIN 53240-2, as at November 2007

Determination of cell size: Optical microscopy evaluation using a VHX 5000 optical microscope; the test specimen to be analyzed is examined at 3 different points in each case over a circular region having a diameter of 5 mm. The resolution is chosen such that the selected region captures around 100 cells. 100 cells are subsequently analyzed and the smallest cell diameter and the "D90" cell diameter ("D90": where 90% of cells are smaller than this value) and also the average arithmetic cell diameter are calculated.

Production of the foams according to examples 1-2 (inventive) and examples 1*-2* (comparative) employed the following substances:

Polyol 1: Polyether polyol based on trimethylolpropane and propylene oxide having a hydroxyl number of 800 mg KOH/g, a functionality of 3 and a viscosity of 6100 mPas at 25° C.

Polyol 2: Polyether polyol based on trimethylolpropane and ethylene oxide having a hydroxyl number of 550 mg KOH/g, a functionality of 3 and a viscosity of 505 mPas at 25° C.

Polyol 3: Polyether polyol based on 1,2-propanediol and propylene oxide having a hydroxyl number of 56 mg KOH/g, a functionality of 2 and a viscosity of 310 mPas at 25° C.

Polyol 4: Polyether polyol based on 1,2-propanediol and propylene oxide having a hydroxyl number of 112 mg KOH/g, a functionality of 2 and a viscosity of 140 mPas at 25° C.

Polyol 5: Polyether polyol based on glycerol and propylene oxide having a hydroxyl number of 231 mg KOH/g, a functionality of 3 and a viscosity of 350 mPas at 20° C.

B 8443: Foam stabilizer (Evonik) based on polyether-polydimethylsiloxane copolymers Ortegol 500: Cell opener (Evonik) based on polybutadiene Potassium acetate/DEG: Catalyst, 25% potassium acetate in diethylene glycol (Covestro)

Dabco NE1070: Catalyst, about 60% 3-(dimethylamino) propylurea in diethylene glycol (Air Products)

1-methylphospholene-1-oxide (Lubio® Polykat 10): Catalyst for carbodiimide production, chemical blowing agent (Schafer Additivsysteme GmbH)

Isocyanate 1: Mixture of monomeric and polymeric MDI having a viscosity of about 290 m Pa*s at 20° C. (Desmodur 44V20L, Covestro)

Production of Molded Polyurethane Foams

To produce molded polyurethane foams, appropriate amounts of polyol formulation (see table 1) according to the desired apparent density were weighed in and homogenized using a stirrer. The thus obtained isocyanate-reactive composition was mixed with the corresponding amount of isocyanate (see table 1) for 10 seconds at 23° C. using a Pendraulik stirrer and the mixture was poured into a mold open at the top having dimensions of 22.5×22.5×6 cm (3.04 L volume). Immediately thereafter, the mold was sealed for 10 minutes with a book press. The precise formulations including the results of corresponding physical examinations and characterization with the abovementioned methods of measurement are summarized in table 1.

TABLE 1

| Example | | 1 | 2 | 1* | 2* |
|---|---|---|---|---|---|
| Formulation | | | | | |
| Polyol 1 | [% by wt.] | 13.00 | 13.00 | 13.00 | 13.00 |
| Polyol 2 | [% by wt.] | 32.50 | 32.50 | 32.50 | 32.50 |
| Polyol 3 | [% by wt.] | 13.50 | 13.50 | 13.50 | 13.50 |
| Polyol 4 | [% by wt.] | 9.50 | 9.50 | 9.50 | 9.50 |
| Polyol 5 | [% by wt.] | 27.00 | 27.00 | 27.00 | 27.00 |
| B 8443 | [% by wt.] | 1.50 | 1.50 | 1.50 | 1.50 |
| Ortegol 500 | [% by wt.] | 0.50 | 0.50 | 0.50 | 0.50 |
| Dabco NE1070 | [% by wt.] | 1.00 | 1.00 | 1.00 | 1.00 |
| 1-methyl phospholene-1-oxide | [% by wt.] | 3.00 | 3.50 | | |
| n-Pentane | [% by wt.] | | | 10.00 | 6.92 |
| Polyol functionality | | 2.916 | 2.916 | 2.916 | 2.916 |
| Isocyanatl | | 91.35 | 91.35 | 91.35 | 91.35 |
| Index | NCO/OH | 100 | 100 | 100 | 100 |
| Apparent density | [kg/m³] | 79 | 84 | 65 | 85 |
| Compressive strength at 10% compression (parallel) | [MPa] | 0.33 | 0.27 | 0.29 | 0.47 |
| Open-cell content | [%] | 94 | 91 | 88 | 78 |
| Average cell size | [μm] | 52 | 47 | 73 | 75 |
| Cell size of smallest cell | [μm] | 19 | 15 | 28 | 17 |
| D90 cell size | [μm] | 76 | 69 | 106 | 118 |

*Comparison

Examples 1 and 2 show that the specified formulation makes it possible to produce very fine-celled rigid foams having a high proportion of open cells. The average cell sizes of the inventive examples are markedly smaller than in the comparative examples where no phospholene oxide was used. At identical apparent density (Example 2+Example 2*) of 85 kg/m³ the average arithmetic cell size may be reduced from 75 μm to 47 μm by using phospholene oxide. This is a distinct advantage in respect of the use of the foams as a core material for vacuum insulation applications since this makes it possible to achieve a lower lambda value at identical pressure.

Examples 1 and 2 further demonstrate that a high open-cell content can be achieved in a molded foam using phospholene oxide as a chemical blowing agent. Comparison of examples 2 and 2* shows that the open-cell content was enhanced by 13%. A high open-cell content is especially important for the subsequent use of the rigid foam as a filling material for vacuum insulation panels since complete evacuation must be guaranteed.

The invention claimed is:

1. An open-celled polyurethane foam having an open-cell content >90% (measured in accordance with ISO 4590: 2002; German version EN ISO 4590:2003), an average arithmetic cell size between 20-90 μm, wherein the average arithmetic cell size is determined by optical microscopy evaluation using a VHX 5000 optical microscope and the test specimen to be analyzed is examined at 3 different points in each case over a circular region having a diameter of 5 mm, the resolution is chosen such that the selected region captures around 100 cells and 100 cells are analyzed, the smallest cell diameter and the "D90" cell diameter ("D90": where 90% of cells are smaller than this value) and the average arithmetic cell diameter are calculated, at an apparent density between 35-120 kg/m3 (measured in accordance with ISO 845:2006; German version EN ISO 845:2009) and a compressive strength at 10% compression (parallel) of 0.20-0.50 mPa (measured in accordance with ISO 844:2014; German version EN ISO 844:2014), obtainable by the reaction of A) an isocyanate-reactive component comprising:
        A1) from 90-100% by weight of at least one polyether polyol having a number-average functionality of 2-6 and an OH number of 50-900 mg KOH/g (DIN 53240-2, as at November 2007) based on ethylene and/or propylene oxide, and from 0-10% by weight of one or more polyester polyols, and
        A2) optionally chain extenders and/or crosslinkers,
    with
    B) at least on isocyanate component,
    And
    C) at least one phospholene oxide which is selected from the group consisting of 1-methylphospholene-1-oxide, 1-ethylphospholene-1-oxide and 1-phenyl phospholene-1-oxide,
    in the presence of
    D) catalysts,
    E) 0.1-2.0% by weight of cell openers, based on 100% of the isocyanate-reactive components (A1) and (A2),
    F) 0.1-5% by weight of surface-active substances and stabilizers, based on 100% of the total weight of the isocyanate-reactive components (A1) and (A2), and
    G) optionally assistants and/or additives,
    wherein the ratio of the NCO groups in component (B) to the sum of the OH groups in the isocyanate-reactive components (A1) and (A2) is 0.9:1 to 1.2:1.

2. The open-celled polyurethane foam as claimed in claim 1 having an average arithmetic cell size between 30-80 μm, wherein the average arithmetic cell size is determined by optical microscopy evaluation using a VHX 5000 optical microscope and the test specimen to be analyzed is examined at 3 different points in each case over a circular region having a diameter of 5 mm, the resolution is chosen such that the selected region captures around 100 cells and 100 cells are analyzed, the smallest cell diameter and the "D90" cell diameter ("D90": where 90% of cells are smaller than this value) and the average arithmetic cell diameter are calculated, at an apparent density between 40-100 kg/m$^3$ (measured in accordance with ISO 845:2006; German version EN ISO 845:2009).

3. The open-celled polyurethane foam as claimed in claim 1 having an average arithmetic cell size between 40-70 μm, wherein the average arithmetic cell size is determined by optical microscopy evaluation using a VHX 5000 optical microscope and the test specimen to be analyzed is examined at 3 different points in each case over a circular region having a diameter of 5 mm, the resolution is chosen such that the selected region captures around 100 cells and 100 cells are analyzed, the smallest cell diameter and the "D90" cell diameter ("D90": where 90% of cells are smaller than this value) and the average arithmetic cell diameter are calculated, at an apparent density between 40-70 kg/m$^3$ (measured in accordance with ISO 845:2006; German version EN ISO 845:2009).

4. A vacuum insulation panel which comprises the open-celled polyurethane foam as claimed in claim 1.

* * * * *